Aug. 7, 1956  C. V. BERGSTROM  2,757,418
HOUSE TRAILER
Filed Jan. 23, 1952  3 Sheets-Sheet 1
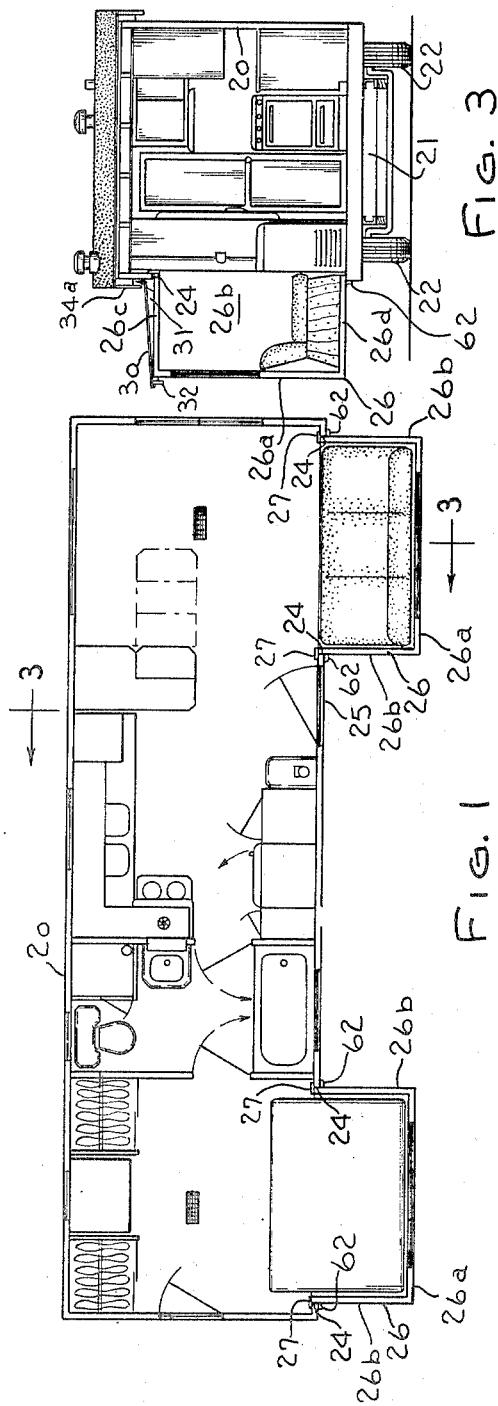
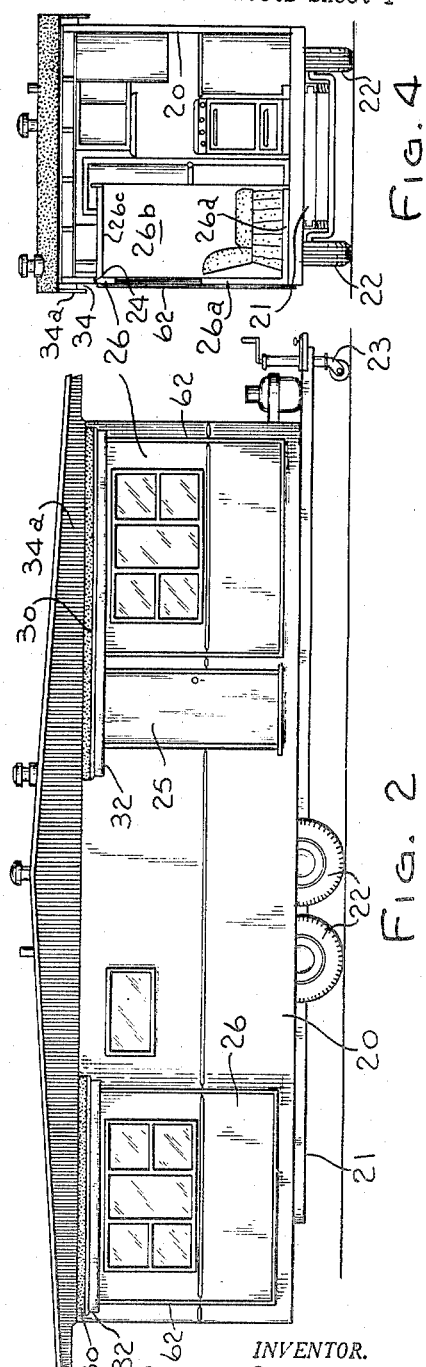
INVENTOR.
Carl V. Bergstrom
BY
Louis O. French
Atty.

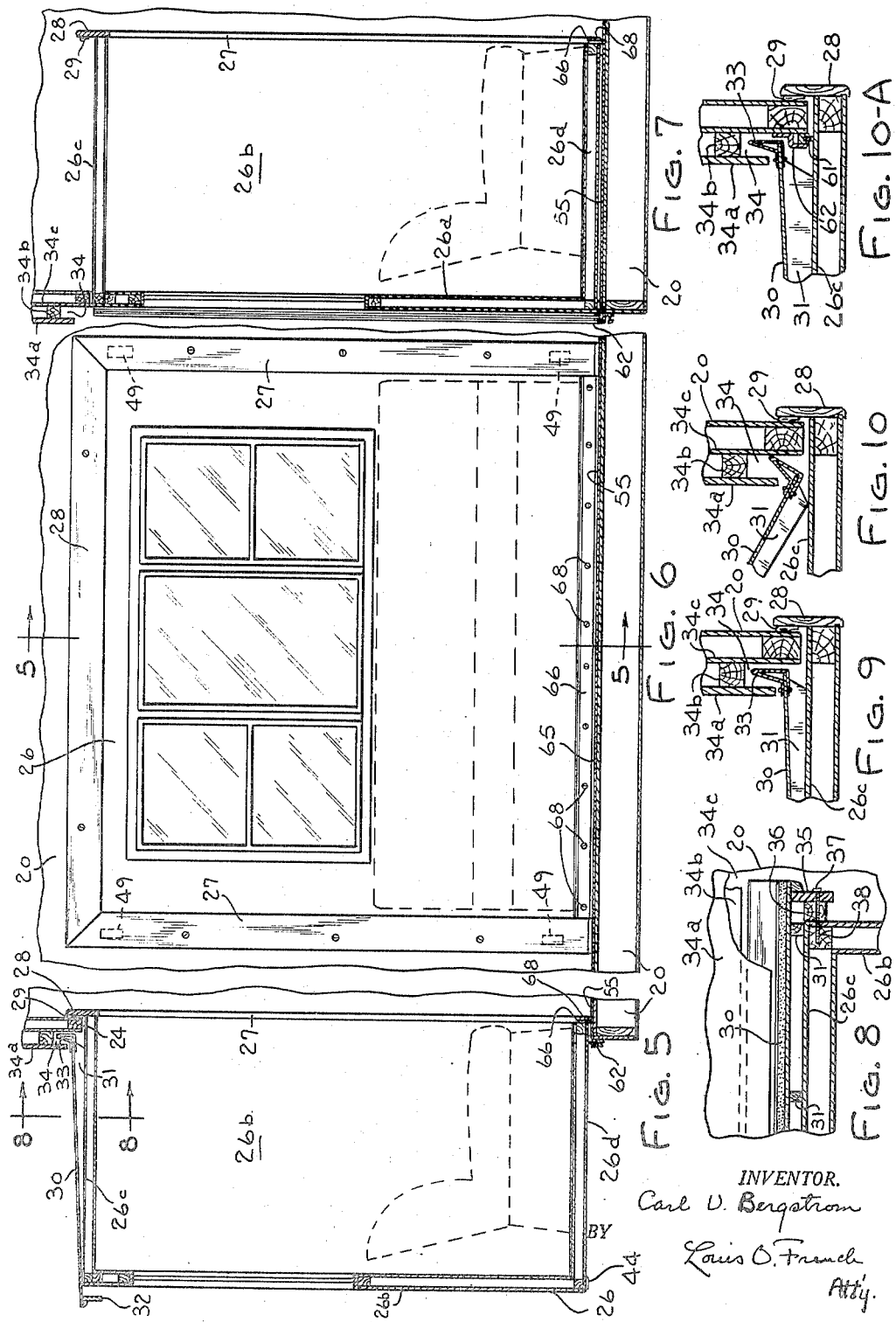

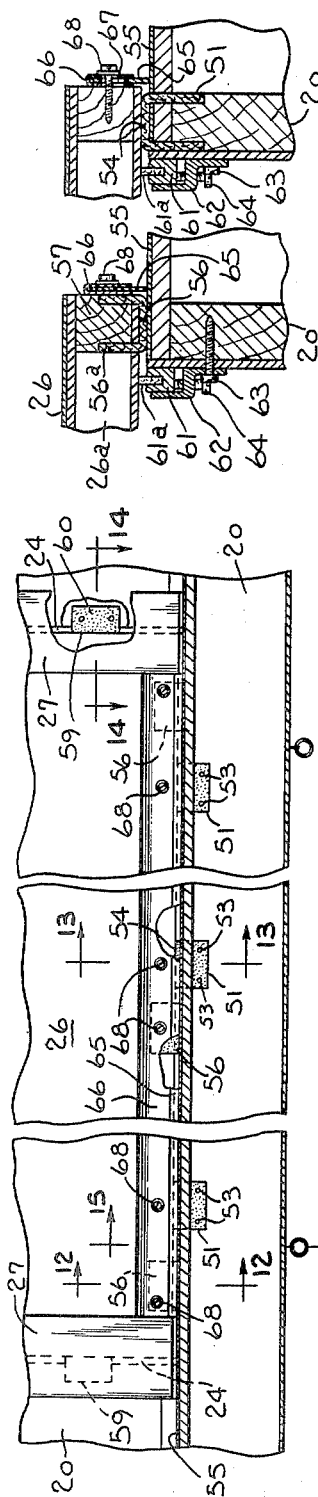

United States Patent Office 2,757,418
Patented Aug. 7, 1956

2,757,418

HOUSE TRAILER

Carl V. Bergstrom, Thomson, Ga.

Application January 23, 1952, Serial No. 267,736

4 Claims. (Cl. 20—2)

The invention relates to house trailers and more particularly to improvements which allow more floor width when it is parked off the highway.

Because of the eight foot limitation in width of a house trailer that may be lawfully towed on the highway, the rooms are necessarily narrow and small if formed within this width and have long been a major objection to trailer living. The object of this invention is to overcome this objection by providing the trailer with expandible sections or bays which can be drawn out from a side or sides of the trailer after it is parked so as to form enlarged living room and bedroom bays, thus increasing the width of these rooms from eight feet to a maximum of fifteen feet four inches.

Another object of this invention is to provide a novel means for capping the pulled out bays with a waterproof shed type roof panel or section.

A further object of the invention is to provide hand grips removably securable along the front lower edge of a movable bay to facilitate moving it in and out relative to the trailer body and removed, when not in use, from the bay so as not to be an eyesore or unnecessary protrusion.

Another object of the invention is to provide automatic catches or locks for holding the bay in either its retracted or extended position and which locks may be readily controlled from outside the trailer by the person manipulating the bay.

Another object of the invention is to provide felt slider means between the bay bottom and the trailer floor to minimize the friction between these parts and also protect the linoleum or other floor covering of the trailer against scratching or marring by contact with the bottom of the bay.

Also a further object is to provide felt protective pads along the sides of the trailer bay openings to protect the bay sides against scratching damage during their movements relative to the body of the trailer.

A further object of the invention is to provide an adjustable weather stripping means at the corners between the bay side and bottom walls and the trailer front wall, which stripping being so mounted and formed that it may be backed away from the side walls when the bay is being moved.

The invention further consists in the several features hereinafter described and more particularly defined by claims at the conclusion hereof.

In the drawings:

Fig. 1 is a floor plan of a house trailer embodying the invention with the bays in extended position;

Fig. 2 is a front elevation view of the house trailer;

Fig. 3 is a vertical sectional view taken on the line 3—3 of Fig. 1;

Fig. 4 is a view similar to Fig. 3 with the bay in its retracted position;

Fig. 5 is a detailed vertical sectional view taken on the line 5—5 of Fig. 6 showing an extended bay;

Fig. 6 is an enlarged elevation view of one of the bays looking from the inside of the trailer;

Fig. 7 is a view similar to Fig. 5 showing the bay retracted;

Fig. 8 is a detailed vertical sectional view taken on the line 8—8 of Fig. 5;

Figs. 9, 10, and 10A are enlarged detailed sectional views of the joint between the roof panel, and bay and the body of the trailer;

Fig. 11 is a detailed vertical sectional view through the trailer looking from the inside of the lower part of one of the bays, parts being broken away;

Fig. 12 is a detailed vertical sectional view taken on the line 12—12 of Fig. 11;

Fig. 13 is a detailed vertical sectional view taken on the line 13—13 of Fig. 11;

Fig. 14 is a detailed horizontal sectional view taken on the line 14—14 of Fig. 11;

Fig. 15 is a detailed vertical sectional view taken on the line 15—15 of Fig. 11;

Fig. 16 is a detailed elevation view of an outside corner of one of the bays, parts being broken away and parts being shown in section;

Fig. 17 is a detailed elevation outside view of a lower part of one of the bays with a pull out handle secured thereto;

Fig. 18 is a detailed vertical sectional view taken on the line 18—18 of Fig. 17;

Fig. 19 is a detailed horizontal sectional view taken on the line 19—19 of Fig. 15.

Referring to the drawings, the main body 20 of the house trailer may be of any suitable construction mounted on a metal under carriage 21 equipped with wheels 22 and a suitable adjustable stabilizer foot 23. In Figs. 1 and 2 the body 20 is shown as provided with side openings 24, one being disposed adjacent the door opening 25.

The features of the invention are concerned with bays 26 that are mounted to move inwardly and outwardly relative to said openings 24. While only two bays at the front side of the trailer are shown, similar bays may be provided in similar openings formed in the rear side wall of the trailer to increase the living space.

Each of the bays 26 has a front wall 26a, side walls 26b, a top 26c, and a floor 26d. Referring to Figs. 5 to 10, a frame member 27 is secured to the back edge of each side wall 26 and a frame member 28 is secured to the back edge of the top wall, each of these frames extending outwardly so as to overlap the adjacent body frame as shown more particularly in Figs. 5, 9, and 14. Where these frame members overlap the body frame, they are provided with weatherproof and bumper strips 29 of flexible looped material tacked to the inner side of each frame member and extending lengthwise thereof. These frame members abut the inner wall of the frame of the trailer adjacent the opening 24 when the bay is in extended position.

When the bay 26 is in its extended position, a separable roof section or panel 30 is mounted over the top of the bay as shown in Figs. 5 and 9. The panel 30 is made of suitable roofing material attached to outwardly tapered lengthwise spaced sets of base ribs 31 which rest upon the top 26c of the bay and give the roof the desired pitch. The front of the panel has a drain member 32 extending lengthwise thereof. The rear edge of the panel has a lengthwise extending water-shedding hook or projection 33 secured thereto designed to fit into a lengthwise extending recess 34 formed by frame members 34a, 34b, and 34c of the trailer body. This roof panel may be quickly put in place after the bay has been pulled out and eliminates the use of roofing material on the bay itself. For locking or holding the panel in place, it has a depending side frame member 35 secured to it carrying a member 36, said members having alined openings to receive a lag screw 37 which screws into an opening 38 in the bay as shown in Fig. 8. The roof panel 30 for the bay 26 adjacent the door opening 25 overlaps the area below this opening so as to form a canopy or roof.

The facilitate moving the bay in and out, the lower frame portion of each bay is equipped with spaced sets of lag screws 39, and handles 40 of sheet metal are provided with spaced slots 41 to slide up under the heads of these screws so that a hand grip is provided, these handles being stored aboard the trailer when not in use.

For locking the bay against movement relative to the body in either its extended or retracted position, spring pressed locking bolts 42 are slidably mounted in metal sleeves 43 inset in the base portion of the trailer frame at the bottom of the opening 24 and adjacent the ends of the bay. Each bolt 42 cooperates with apertured metal strike plates 44 mounted on the bottom of the bay, one plate being at the front and the other at the back of the bay, the holes 44a in these plates preferably being laterally elongated. A spring 45 urges each bolt 42 to a locking position, and each bolt is released from its locking position by a pull chain 46 which connects with the lower end of the bolt and extends down through the sleeve 43 and a bore 47 in the trailer frame to an exteriorly disposed pull ring 48 which is manipulated from the outside of the trailer. This chain operated detent or bolt 42 can be readily held in a release position by pulling down on the chain to release the bolt and then inserting a nail or other metal rod through one of the chain links so that it engages the bottom of the trailer frame and acts as a stop. With the detents released, the bay may be moved to either of its positions and then locked by releasing the part holding the chain. Instead of a nail, a catch 49 provided with a keyhole slot 50 may be slidably mounted on the bottom of the trailer frame member so that the smaller part of said slot will engage between adjoining chain links when the detent is retracted to hold it in a retracted position. This arrangement permits the locks being controlled from outside the trailer by the person manipulating the bay.

Referring to Figs. 11, 12, and 13, the base frame member of the trailer at spaced points has the legs 51 of U-shaped felt strips secured thereto by nails 53 to provide pads 54 which project above the top of the floor 55 of the trailer. Offset to one side of each of these pads are felt pads 56 secured to the rear bottom frame member 57 of the bay so as to project below said bay and engage said floor 55, said pads having legs 56a secured to said frame member. Thus when the bay is in retracted position, it rests on the pads 54 and 56, and as it is drawn out, its bottom slides over the pad 54 and the pads 56 slide along the floor 55. This arrangement is less expensive than the use of metal guide rollers which in most cases are prone to rust.

Referring to Figs. 11 and 14, each of the side frame members 58 of the trailer forming parts lining the side opening 24 is provided with a series of felt pads 59, similar to the pads 54 and having their legs 60 secured to said frame members in the same way that the pads 54 are secured to the trailer frame, and project from these frame members so as to form a guide for the sides of the bays when they are moved in and out relative to the opening 24.

Referring to Figs. 11, 12, 13, 14, 15, and 16, when the bay is in its extended or contracted position, the spaces formed between the bay and the opening 24 are protected by a special weather stripping which in each instance includes a weather strip sealing member 61 which extends the length of both sides and bottom along the outside face edge of the opening 24, which strips are mounted for sliding movement between the outer wall of the trailer frame adjacent the opening and an angled metal guide 62 secured by screws 63 to said trailer frame. The sealing members 61 have their flexible portions 61a held in sealing engagement with the adjacent bay by screws 64 mounted in the guides 62 and bearing against the backs of the members 61. The screws 64 are backed off to allow the strip members 61 to loosely engage or be backed off the bay when it is moved in either direction but are tightened up when the bay is in either its extended or retracted position. This prevents wear on the weather stripping and makes it easier to move the bay.

While the Figs. 11 to 16 show adjustable weather stripping means 62 with its inner member 61 along only the sides and bottom of the bay, it is to be understood that the same type of sealing may be employed as well along the top of the bay adjacent the outside wall and using the same type of corner joint between the top member and side member as shown in Fig. 16. Fig. 10A shows how the adjustable outside sealing means may be employed while still allowing the bay roof cap to be hooked in under the gable front extension 34a, thus retaining the watershed protection feature between the bay roof and trailer sides.

The lower back edge of each bay carries a flexible weather strip 65 mounted in a U-shaped metal strip 66 which has enlarged holes 67 through which clamping screws 68 anchored to the frame member 57 pass to secure the strip in contact with the floor 55.

I desire it to be understood that this invention is not to be limited to any particular arrangement or construction of parts except in so far as such limitations are included in the appended claims.

What I claim as my invention is:

1. In a house trailer having an opening in its exterior wall, the combination of a recess in said wall opening downwardly and extending lengthwise of and adjacent the top side of said opening, a bay mounted to slide in said opening to a retracted position flush with said wall while on the highway and to an extended position when on site, said bay having a top, a removable roof panel mounted over the top of the bay in its extended position having a portion extending into said recess in said wall of the trailer and its main portion inclined downwardly to provide a water shed.

2. In a house trailer having an opening in its exterior wall, the combination of a recess in said wall opening downwardly and extending lengthwise of and adjacent the top side of said opening, a bay mounted to slide in said opening to a retracted position flush with said wall while on the highway and to an extended position when on site, said bay having a top, a removable roof panel having spaced tapered ribs that rest on the top of the bay and incline the body of the panel downwardly, said panel having at its rear edge a part extending upwardly into the recessed portion of the wall of the trailer.

3. In a house trailer having a wall provided with a door opening and an opening adjacent the door opening, the combination of a bay mounted to move in and out relative to said last named opening and having a top, and a removable roof panel mountable on the top of said bay in its extended position and having a portion projecting over the front of said door opening.

4. In a house trailer having an opening in its exterior wall, the combination of a recess in said wall opening downwardly and extending lengthwise of and adjacent the top side of said opening, a bay mounted to slide in said opening to a retracted position flush with said wall while on the highway and to an extended position when on site, said bay having a top, a removable roof panel having spaced tapered ribs that rest on the top of the bay and incline the body of the panel downwardly, said panel having at its rear edge a part extending upwardly into said recess in said wall of the trailer, said roofing panel having a depending overhanging side portion and means passing through said depending portion and anchored to the bay to secure said roof panel against movement.

(References on following page)

References Cited in the file of this patent

UNITED STATES PATENTS

| | | |
|---|---|---|
| 160,555 | Underwood | Mar. 9, 1875 |
| 467,423 | Merritt | Jan. 19, 1892 |
| 938,883 | Maier | Nov. 2, 1909 |
| 1,521,635 | Lewis | Jan. 6, 1925 |
| 1,688,458 | Eveleth | Oct. 23, 1928 |
| 1,751,899 | Whitfield | Mar. 25, 1930 |
| 1,753,513 | Hansen | Apr. 8, 1930 |
| 1,832,615 | Bittorf | Nov. 17, 1931 |
| 2,136,130 | Gorlenko | Nov. 8, 1938 |
| 2,175,632 | Maga | Oct. 10, 1939 |
| 2,318,800 | Rakow | May 11, 1943 |
| 2,355,663 | McGlothlin | Aug. 15, 1944 |
| 2,388,734 | Funk | Nov. 13, 1945 |
| 2,494,680 | Wiley | Jan. 17, 1950 |
| 2,581,192 | LaFleur | Jan. 1, 1952 |
| 2,599,434 | Crane | June 3, 1952 |
| 2,606,057 | Johnson | Aug. 5, 1952 |
| 2,678,866 | Merrett | May 18, 1954 |

FOREIGN PATENTS

| | | |
|---|---|---|
| 543,745 | Great Britain | Mar. 11, 1942 |
| 640,518 | Great Britain | July 19, 1950 |